United States Patent
Thomas

(10) Patent No.: US 6,929,104 B2
(45) Date of Patent: Aug. 16, 2005

(54) VERTICALLY ORIENTED DUAL CIRCUIT PILOT MASTER CYLINDER

(75) Inventor: James A. Thomas, Spencerville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/671,092

(22) Filed: Sep. 25, 2003

(65) Prior Publication Data
US 2005/0067243 A1 Mar. 31, 2005

(51) Int. Cl.⁷ .............................. B60T 11/20; F15B 7/08
(52) U.S. Cl. ..................... 188/345; 188/152; 60/581; 60/594
(58) Field of Search ............................. 188/105, 106 P, 188/345, 151 R, 152; 303/6.1, 114.2; 60/594, 581

(56) References Cited

U.S. PATENT DOCUMENTS

| | | | | |
|---|---|---|---|---|
| 2,020,465 A | * | 11/1935 | Hall | 60/594 |
| 2,070,298 A | * | 2/1937 | Schnell | 60/594 |
| 2,844,940 A | * | 7/1958 | Huber | 60/588 |
| 3,049,885 A | * | 8/1962 | Tuten | 188/345 |
| 3,113,433 A | * | 12/1963 | Kohlman | 188/345 |
| 3,153,328 A | * | 10/1964 | Seethaler | 188/345 |
| 3,345,112 A | * | 10/1967 | Kershner | 188/345 |
| 3,360,938 A | * | 1/1968 | Davis | 188/345 |

FOREIGN PATENT DOCUMENTS

| | | | | | |
|---|---|---|---|---|---|
| FR | 2538765 A | * | 7/1984 | | B60T/11/26 |
| JP | 57022919 A | * | 2/1982 | | B60K/23/02 |
| JP | 2002242955 A | * | 8/2002 | | F16D/25/08 |

* cited by examiner

Primary Examiner—Thomas Williams
(74) Attorney, Agent, or Firm—Jeffrey P. Calfa; Dennis Kelly Sullivan; Susan L. Lukasik

(57) ABSTRACT

A dual circuit pilot master cylinder for a full power brake system provides a minimally sized package for installation in a vehicle cab interior. The master cylinder utilizes a side-by-side disposition of the primary and secondary cylinders and a brake pedal linkage to the pistons allowing flexibility in location of the device.

5 Claims, 3 Drawing Sheets

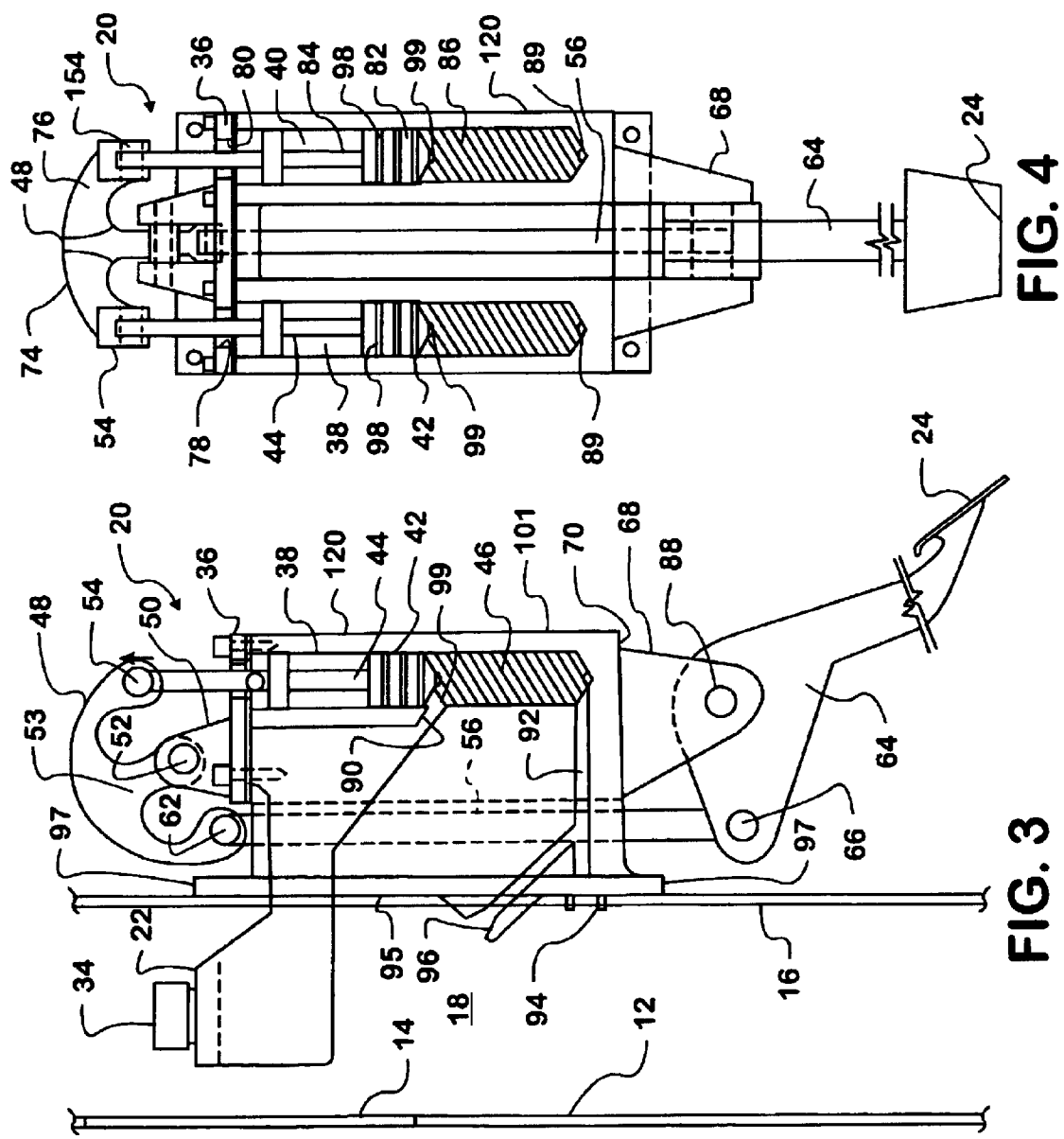

VERTICALLY ORIENTED DUAL CIRCUIT PILOT MASTER CYLINDER

BACKGROUND OF THE INVENTION

1. Technical Field

The invention relates to vehicle brake systems and more particularly to a pilot master cylinder for the brake system which is positionable inside the vehicle cab.

2. Description of the Problem

Front engine busses pose a number of problems for engine and vehicle system layout not inherent in conventional or rear engine configurations. Front engine busses have a characteristic flat front or "snub nose" appearance, with the bus driver and engine positioned over the front wheels. The front dash panel is spaced from the front wall of the vehicle by only a few inches. Access to the engine is from the passenger compartment or through relatively small panels in the sides or front of the vehicle. The engine compartment is much smaller than in conventional engine vehicles and components that are located in the engine compartment of conventional engine vehicles, such as brake master cylinders, must frequently be relocated due to size considerations and to considerations relating to providing linkages between operator controls, such as between a brake pedal and the brake master cylinder. For example, in a conventional engine bus a standard horizontally inclined master cylinder may be used where in a front engine bus the master cylinder has frequently had to be relocated due to lack of under hood clearance. On front engine vehicles the brake master cylinder has commonly been located on the vehicle frame, where it is exposed to road splash which poses a corrosion threat.

Recent developments in vehicle design favor the use of full power brake systems where the brake master cylinder, rather than providing the required pressure for actuating the brakes, provides a hydraulic pilot signal to an electronic controller, which in turn generates the signals for actuation, modulation and release of the individual wheel end brakes for normal braking, anti-lock braking, stability control and traction control. It would be advantageous to exploit the elimination of the need for power boost to configure a pilot master cylinder which could be repositioned off the frame of the vehicle, preferably to inside the passenger compartment or the under hood compartment to avoid corrosion exposure and improve accessibility.

SUMMARY OF THE INVENTION

According to the invention there is provided a dual circuit pilot master cylinder for a brake system. A cylinder housing has top and bottom sides and includes fittings for attachment of the cylinder housing to a vehicle dash panel or other advantageous location. A pair of cylinders is disposed in the cylinder housing in parallel to one another and extending vertically into the cylinder housing from adjacent the top side. A piston is positioned in each cylinder for reciprocating motion. A linkage connects to the two pistons to a foot actuated lever for joint up and down movement. The linkage further includes a crank fulcrum positioned on the top side of the cylinder housing and a lever fulcrum depending from the bottom side of the cylinder housing. A crank having opposing ends is mounted for pivoting movement in the crank fulcrum. Piston rods extend from the pistons out of the cylinders for connection to ends of the crank on one side of the crank fulcrum. A brake pedal lever mounted in the lever fulcrum has ends on opposed sides of the lever fulcrum. A push rod extends from a point of connection with an end of the brake pedal lever below the bottom side of the cylinder housing to a point of connection with the an end of the crank above the top side of the cylinder housing. A pedal is disposed on the end of the lever opposite the end connected to the push rod. A working fluid reservoir is mounted on the outside face of the dash panel opposite the cylinder housing and is provided with couplings to the cylinders extending through the dash panel.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a cross sectional view of a dual circuit pilot master cylinder.

FIG. 4 is a cross sectional view taken at a right angle with respect to FIG. 3 of the dual circuit pilot master cylinder.

DETAILED DESCRIPTION OF THE INVENTION

Figure 1:
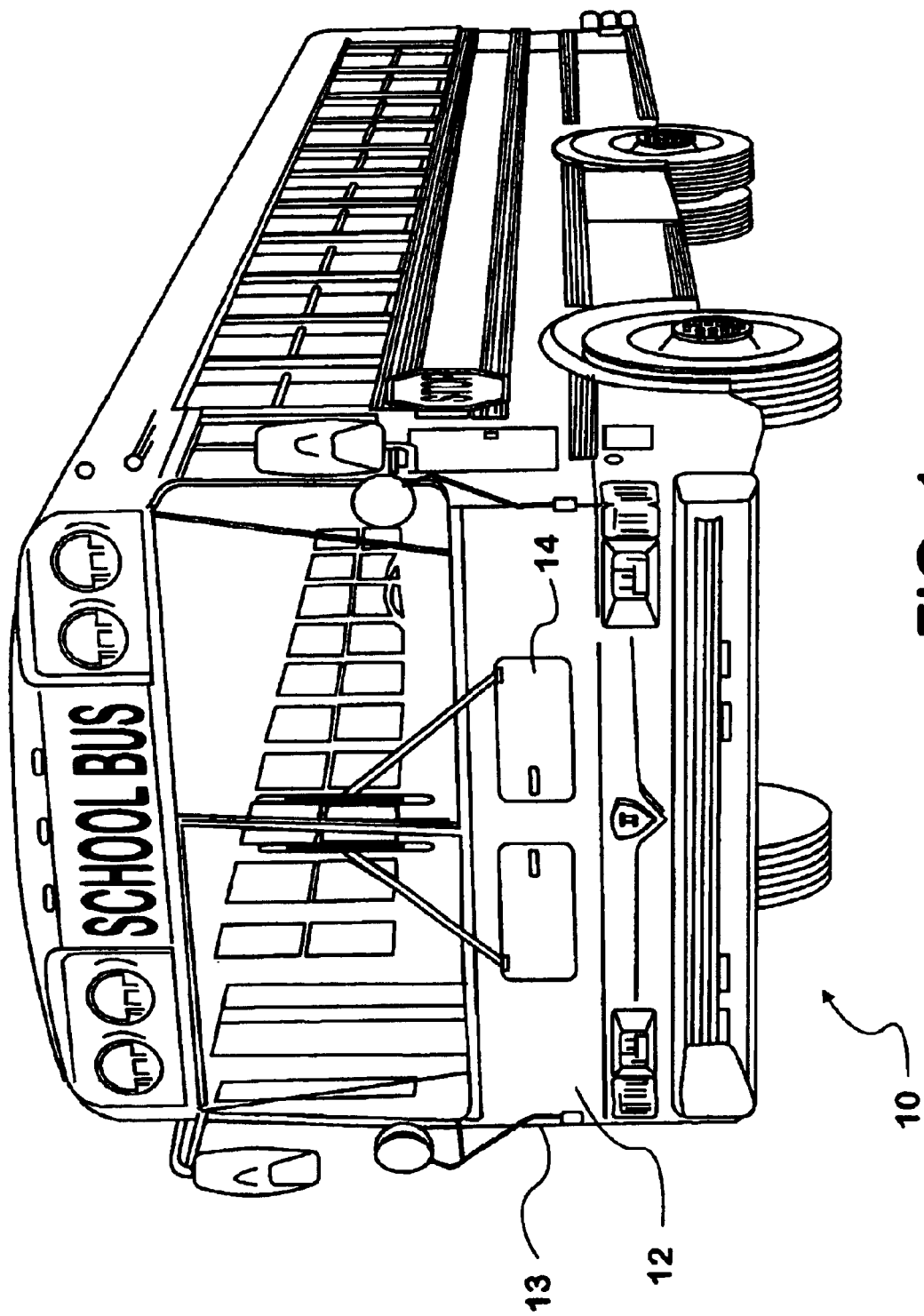
FIG. 1 is a perspective view of a front engine bus with which the invention is advantageously employed.

Referring to the drawings, and particularly to FIG. 1, a bus 10 on which the present invention is advantageously employed is illustrated. Bus 10 is a front engine bus with a square front end 13 which maximizes the portion of vehicle length available for passenger seating and which positions a driver close to the front end to improve sight lines. A penalty of this arrangement is more difficult access to the vehicle's engine, which is located behind a flat front wall 12 and which is accessed for checking fluid levels through access doors 14. The dual circuit pilot master cylinder 20 may of course be used with other types of vehicles, but its novel and non-obvious features lend it particularly useful in vehicles of the type depicted.

Figure 2:
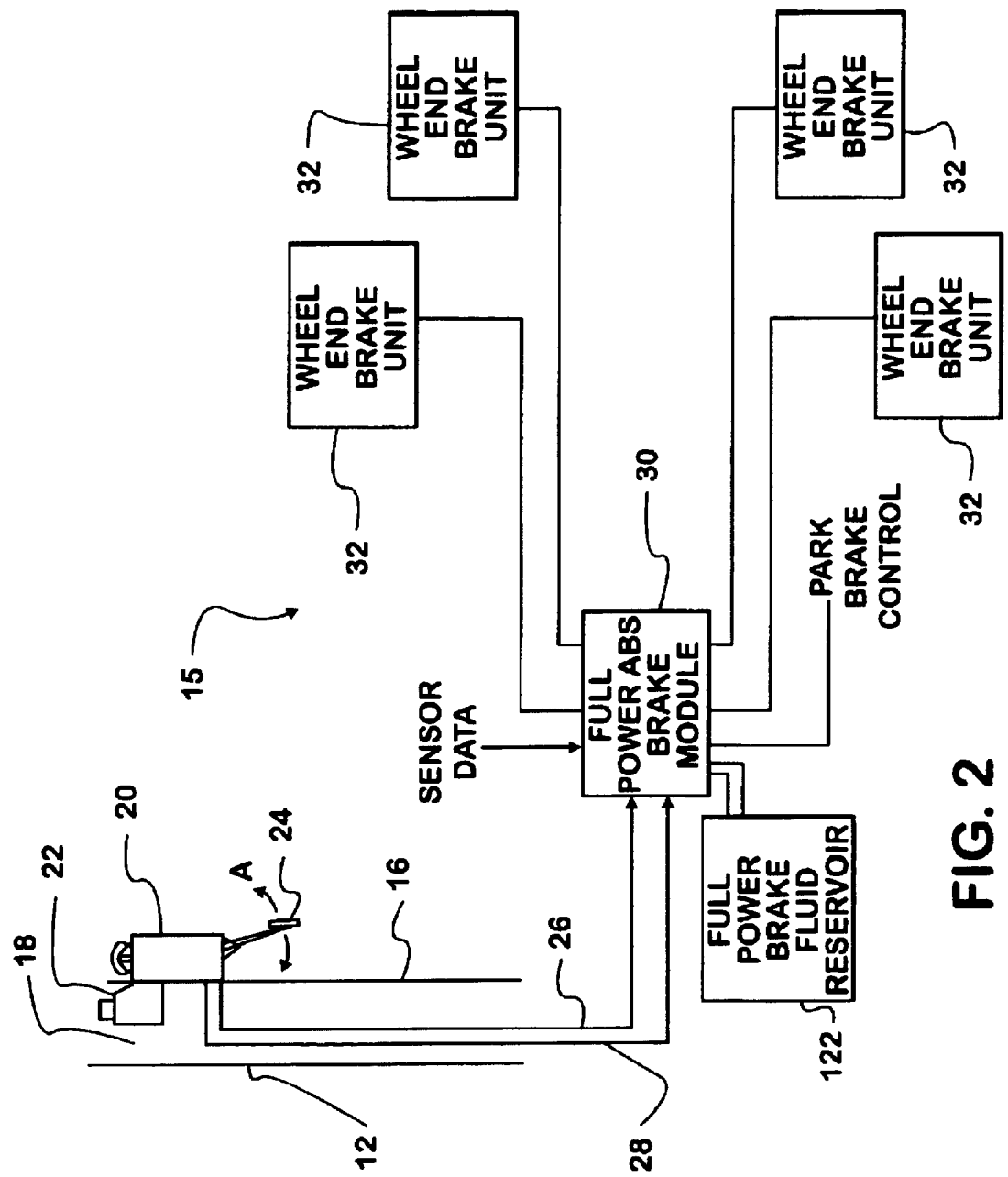
FIG. 2 is a high level schematic of a vehicle brake system.

FIG. 2 illustrates a full power vehicle braking system 15 as may be advantageously used with bus 10 of FIG. 1. Braking system 15 incorporates as many wheel end brake units 32 as there are ends of axles on the vehicle. For bus 10 four wheel end brake units 32 are employed. Braking system 15 is actuated by a driver using a dual circuit pilot master cylinder 20 which is mounted on the inside of the vehicle cab from a dash panel 16. A hydraulic fluid reservoir 22 is mounted on the opposite side of dash panel 16 in a gap 18 between vehicle front wall 12 and the dash panel. A brake pedal 24 depends from dual circuit pilot master cylinder 20 being positioned below the master cylinder and having an actuation arc A in a plane that is vertical and perpendicular with respect to dash panel 16. Dual circuit pilot master cylinder 20 is connected to a full power brake module 30 by a primary hydraulic pilot circuit 26 and a secondary hydraulic pilot circuit 28. Full power brake module 30 generates control signals for the wheel end brake units 32 in response to the signals received on the pilot circuits and to sensor data (e.g. vehicle speed, wheel lock up, parking brake status, etc.) in accord with the requirements of stopping the vehicle at a rate proportional to the pressure of the pilot signals while maintaining control, avoiding skidding and maintaining vehicle stability. Operation of full power brake module 30 is supported by a full power brake fluid reservoir 122.

Referring now to FIGS. 3 and 4, dual circuit pilot master cylinder 20 is illustrated in detail. Dual circuit pilot master cylinder 20 comprises a housing 120 which encloses primary and secondary circuit cylinders 38 and 40. The housing 120 is, in a preferred application, hung from its back face 95 on the inside face of a dash panel 16. A back side 95 of housing 120 is contoured to fit the shape of the face of dash panel 16 and includes flanges 97 which extend beyond the dimensions of housing 120. Conventional fasteners may be fitted through flanges 97 to hold housing 120 to dash panel 16. Primary circuit cylinder 38 is disposed upright and parallel to secondary circuit cylinder 40, the cylinders being located in a vertical plane spaced away from dash panel 16.

Brake fluid is supplied to primary and secondary circuit cylinders 38 and 40 from a reservoir 22 located in gap 18 between dash panel 16 and front wall 12. The fluid is delivered through a conduit 90 to inlets 99 into the cylinders located about half way between the tops and the bottoms of the cylinders. Reservoir 22 is filled with replacement fluid through a fill point 34 accessed via an access door 14 in the vehicle's front wall 12. Reservoir 22 is conventionally fabricated from plastic and divided by an internal baffle for the primary and secondary circuits. Reservoir fluid level is marked by full and low lines.

Brake fluid is displaced from cylinders 38, 40 by downward movement of pistons 42, 82 in cylinders 38, 40. Brake fluid moves out through outlets 89 near the bottommost points in the cylinders through outlet channels 92 to delivery outlets 96 for and into primary and secondary hydraulic pilot circuits 26, 28 (fluid delivery from cylinder 40 to the secondary hydraulic pilot circuit 28 is not shown but is identical to that for the primary hydraulic pilot circuit 26). Fluid returns to the cylinders 38, 40 with upward movement of pistons 42, 82. Delivery outlet 96 is tapped by an upwardly slanted primary (and identical secondary) pressure switch port 96. Both the delivery port 94 and pressure switch port 96 for both the primary and secondary systems pass through the dash panel 16 for connections inside gap 18. The areas around all outlets are bossed to extend through openings in dash panel 16 to ease making the appropriate switch and hydraulic circuit connections.

Cylinders 38, 40 are located in a side by side arrangement in housing 120 which are outwardly displaced from dash panel 16 and located near the front face 101 of the housing. Cylinders 38, 40 are vertically oriented and pistons 42, 82 are disposed in the cylinders for reciprocating up and down movement. Extending upwardly from pistons 42, 82 are piston rods 44, 84, respectively. Piston rods 44, 84 extend through openings 78, 80 in an upper cover plate 36 to pin connections 54, 154 in tines 74, 76 of a forked bell crank 48. Pistons 42, 82 are upwardly biased in position by rebound compression springs 46, 86 located in cylinders 38, 40 between the pistons and the bottoms of the cylinders. Pistons 42, 82 are of piston and follower design to better maintain alignment and relieve stress from piston seals 98.

Pistons 42, 82 are manually operated by force applied to a brake pedal 24 hung below housing 120. Pedal 24 swings in an arc A (shown in FIG. 2) which is located in a vertical plane perpendicular to dash panel 16. Brake pedal 24 is connected to pistons 42, 82 by a linkage which assures that pistons 42, 82 move in unison. The linkage comprises: piston rods 44, 84; forked bell crank 48; a push rod 56; and a pedal lever 64. Forked bell crank 48 is supported at a fixed point above housing 120 on upper cover plate 36 by a crank fulcrum 50. Pedal lever 64 hangs from a fixed point below housing 120 from a pedal lever fulcrum 68 extending from bottom side 70 of the housing. Forked bell crank 48 is connected to crank fulcrum 50 on a pin 52 through a central member 53 of the forked bell crank which allows the forked bell crank to rock back and forth from end to end. Similarly, pedal lever 64 is supported by a pin 88 through a centered location allowing the pedal lever to pivot. Pins 52 and 88 are parallel to back side 95 of housing 120 and to one another. Each is positioned horizontally making the planes of rotation of forked bell crank 48 and pedal lever 64 coincident. Forked bell crank 48 and pedal lever 64 each have inner ends close to dash panel 16 and outer ends distal to the dash panel. Forked bell crank 48 divides into two tines 74 and 76 on its side distal to dash panel 16. Brake pedal 24 is mounted to the outer end of pedal lever 64 distal to dash panel 16. Piston rods 44, 84 are pivotally pinned to forked bell crank 48 away from dash panel 16 to take stress off of piston seals 98.

Pedal lever 64 is linked to forked bell crank 48 by a push rod 56 positioned to pass through a space in the back of housing 120 between the housing and dash panel 16. Push rod 56 is connected to the inner ends of forked bell crank 48 and pedal lever 64. Pivot pins 62 and 66 provide the means of connection between the respective ends of push rod 56 and forked bell crank 48 and pedal lever 64, respectively. Depression of brake pedal 24 thus is transmitted to forked bell crank 48 by upward movement of push rod 56, and corresponding, joint downward movement of piston rods 44, 84. The motion is coupled to the pair of pistons 42, 82 imparting to the pistons joint up and down motion in the cylinders with the foot actuated pedal lever 64 having a motion in a vertical plane perpendicular to the dash panel 16.

Forked bell crank 48 divides into first and second tines 74, 76 on the end away from the point of connection to push rod 56. This allows pedal lever 64 to be centered between cylinders 38, 40.

The invention provides for an internally mountable dual hydraulic circuit pilot master cylinder for a motor vehicle brake system that fits into a foot print as small as those for an air brake system valve package. The system reservoir is readily positioned for ease of access on a variety of vehicle types. The arrangement of the system also makes it largely self bleeding and provides a readily accessible point for mounting of a pressure switch and for final bleeding of both pilot delivery circuits.

While the invention is shown in only one of its forms, it is not thus limited but is susceptible to various changes and modifications without departing from the spirit and scope of the invention.

What is claimed is:

1. A dual circuit pilot master cylinder for a brake system, comprising:
    a cylinder housing having top and bottom sides and fittings for attachment of the cylinder housing to a vehicle dash panel;
    a pair of cylinders in the cylinder housing which are disposed to be parallel to one another and to extend vertically into the cylinder housing from adjacent one of the sides of the cylinder housing;
    a pair of pistons, a different one of which is disposed in each cylinder for reciprocating motion;
    a linkage including a foot actuated lever coupled to the pair of pistons for imparting to the pistons plunging motion into the cylinders;
    the pair of cylinders extending from adjacent the top side of the cylinder housing into the housing toward the bottom side;

the linkage further including a crank fulcrum positioned with respect to the top side of the cylinder housing;

a lever fulcrum positioned with respect to the bottom side of the cylinder housing;

a crank having opposing ends mounted for pivoting movement in the crank fulcrum;

piston rods extending from the pistons out of the cylinders for connection to ends of the crank on one side of the crank fulcrum;

a lever mounted in the lever fulcrum having ends on opposed sides of the lever fulcrum;

a push rod extending from below the bottom side of the cylinder housing to above the top side of the cylinder housing and connected at opposite ends to free ends of the lever and the crank, respectively; and a pedal disposed on the end of the lever opposite the end connected to the push rod.

2. A dual circuit pilot master cylinder for a brake system as set forth in claim 1, further comprising:

a working fluid reservoir; and couplings between the working fluid reservoir and the cylinders extending through the dash panel.

3. A vehicle comprising:

a dash panel;

a front wall spaced forward from the dash panel;

a brake fluid reservoir positioned between the dash panel and the front wall;

a cylinder housing mounted on an opposite face of the dash panel from the brake fluid reservoir;

first and second cylinders inside the cylinder housing disposed parallel to one another and upright with respect to vehicle orientation;

first and second pistons disposed for reciprocating movement up and down inside the first and second cylinders, respectively;

first and second piston rods extending upwardly from the first and second pistons, having free ends extending above the cylinder housing;

a crank fulcrum mounted on a top side of the cylinder housing;

a forked crank pivotally mounted in the crank fulcrum, the forked crank having first and second tines extending away from one side of the crank fulcrum which attach to free ends of the first and second piston rods and an arm extending in the opposite direction;

a push rod extending vertically parallel to the cylinders attached at one end to the arm of the forked crank;

a lever attached at one end to the end of the push rod opposite the end of the push rod attached to the arm of the forked crank; and a pump fulcrum extending from a bottom side of the cylinder housing in which the lever is pivotally mounted.

4. A vehicle as set forth in claim 3, further comprising:

first and second outlets from the first and second cylinders, respectively;

a power brake module; and first and second pilot circuits coupling the first and second outlets, respectively, to the power brake module.

5. A vehicle as set forth in claim 4, further comprising:

the first and second outlets extending through the dash panel.

* * * * *